(12) United States Patent
Benko et al.

(10) Patent No.: US 8,446,367 B2
(45) Date of Patent: May 21, 2013

(54) CAMERA-BASED MULTI-TOUCH MOUSE

(75) Inventors: Hrvoje Benko, Seattle, WA (US); Daniel Allen Rosenfeld, Seattle, WA (US); Eyal Ofek, Redmond, WA (US); Billy Chen, Bellevue, WA (US); Shahram Izadi, Cambridge (GB); Nicolas Villar, Cambridge (GB); John Helmes, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 585 days.

(21) Appl. No.: 12/425,408

(22) Filed: Apr. 17, 2009

(65) Prior Publication Data

US 2010/0265178 A1     Oct. 21, 2010

(51) Int. Cl.
*G09G 5/08*   (2006.01)

(52) U.S. Cl.
USPC .................. 345/166; 345/163; 178/18.09

(58) Field of Classification Search
USPC ....... 345/163–166, 156, 173–178; 178/18.01, 178/18.09, 18.11
See application file for complete search history.

(56) References Cited

U.S. PATENT DOCUMENTS

| | | |
|---|---|---|
| 4,311,468 A | 1/1982 | Kiel et al. |
| 5,414,521 A | 5/1995 | Ansley |
| 5,463,725 A | 10/1995 | Henckel et al. |
| 5,852,450 A | 12/1998 | Thingvold |
| 5,945,985 A | 8/1999 | Babin et al. |
| 5,990,990 A | 11/1999 | Crabtree |
| 6,008,800 A | 12/1999 | Pryor |
| 6,027,343 A | 2/2000 | Ho |
| 6,064,423 A | 5/2000 | Geng |
| 6,100,862 A | 8/2000 | Sullivan |
| 6,115,025 A | 9/2000 | Buxton |
| 6,124,685 A | 9/2000 | Toriu et al. |
| 6,278,419 B1 | 8/2001 | Malkin |
| 6,409,351 B1 | 6/2002 | Ligon |

(Continued)

FOREIGN PATENT DOCUMENTS

| | | |
|---|---|---|
| EP | 1195637 | 4/2002 |
| FR | 2821168 A1 * | 8/2002 |

(Continued)

OTHER PUBLICATIONS

Ricker Thomas, "Apple Applies for Multi-Touch Mouse Patent", Retrieved at <<http://www.engadget.com/2007/07/05/apple-applies-for-multi-touch-mouse-patent/>>, Jul. 5, 2007, pp. 1-5.

(Continued)

*Primary Examiner* — Dmitriy Bolotin

(57) ABSTRACT

Technologies for a camera-based multi-touch input device operable to provide conventional mouse movement data as well as three-dimensional multi-touch data. Such a device is based on an internal camera focused on a mirror or set of mirrors enabling the camera to image the inside of a working surface of the device. The working surface allows light to pass through. An internal light source illuminates the inside of the working surface and reflects off of any objects proximate to the outside of the device. This reflected light is received by the mirror and then directed to the camera. Imaging from the camera can be processed to extract touch points corresponding to the position of one or more objects outside the working surface as well as to detect gestures performed by the objects. Thus the device can provide conventional mouse functionality as well as three-dimensional multi-touch functionality.

20 Claims, 7 Drawing Sheets

U.S. PATENT DOCUMENTS

| | | | |
|---|---|---|---|
| 6,411,337 | B2 | 6/2002 | Cove et al. |
| 6,449,887 | B1 | 9/2002 | Song |
| 6,527,555 | B1 | 3/2003 | Storm |
| 6,720,956 | B1 | 4/2004 | Honma et al. |
| 6,753,847 | B2 | 6/2004 | Kurtenbach et al. |
| 6,756,966 | B2 | 6/2004 | Dirksen et al. |
| 6,773,262 | B1 | 8/2004 | Blum |
| 6,793,350 | B1 | 9/2004 | Raskar et al. |
| 7,084,859 | B1* | 8/2006 | Pryor .......................... 345/173 |
| 7,466,843 | B2* | 12/2008 | Pryor .......................... 382/103 |
| 7,535,489 | B2* | 5/2009 | Nonaka et al. ............ 348/207.1 |
| 7,710,391 | B2* | 5/2010 | Bell et al. ..................... 345/156 |
| 8,066,378 | B2 | 11/2011 | Lalley et al. |
| 2002/0070277 | A1* | 6/2002 | Hannigan ................ 235/462.45 |
| 2003/0006973 | A1 | 1/2003 | Omura et al. |
| 2003/0142144 | A1 | 7/2003 | Balakrishnan et al. |
| 2004/0001111 | A1 | 1/2004 | Fitzmaurice et al. |
| 2004/0184013 | A1 | 9/2004 | Raskar et al. |
| 2004/0260469 | A1 | 12/2004 | Mizusawa |
| 2005/0001920 | A1 | 1/2005 | Endler et al. |
| 2005/0110964 | A1* | 5/2005 | Bell et al. ..................... 353/122 |
| 2005/0275628 | A1 | 12/2005 | Balakrishnan et al. |
| 2006/0017692 | A1 | 1/2006 | Wehrenberg et al. |
| 2006/0125822 | A1 | 6/2006 | Kurtenbach et al. |
| 2006/0132501 | A1* | 6/2006 | Nonaka et al. ................ 345/619 |
| 2006/0167990 | A1 | 7/2006 | Tobiasen et al. |
| 2006/0227303 | A1 | 10/2006 | Matsubara et al. |
| 2006/0227416 | A1 | 10/2006 | Balu et al. |
| 2007/0152966 | A1* | 7/2007 | Krah et al. .................... 345/163 |
| 2007/0152984 | A1 | 7/2007 | Ording et al. |
| 2007/0159459 | A1 | 7/2007 | Wang |
| 2007/0183685 | A1 | 8/2007 | Wada et al. |
| 2007/0229546 | A1 | 10/2007 | Klassen et al. |
| 2007/0247435 | A1 | 10/2007 | Benko et al. |
| 2007/0247439 | A1 | 10/2007 | Daniel et al. |
| 2007/0257891 | A1 | 11/2007 | Esenther et al. |
| 2007/0271524 | A1 | 11/2007 | Chiu et al. |
| 2007/0279381 | A1 | 12/2007 | Odell et al. |
| 2008/0084400 | A1 | 4/2008 | Rosenberg |
| 2008/0088587 | A1* | 4/2008 | Pryor .......................... 345/158 |
| 2008/0088593 | A1 | 4/2008 | Smoot |
| 2008/0109717 | A1 | 5/2008 | Krauter |
| 2008/0152297 | A1 | 6/2008 | Ubillos |
| 2008/0158145 | A1 | 7/2008 | Westerman |
| 2008/0179507 | A2* | 7/2008 | Han ............................ 250/224 |
| 2008/0180399 | A1 | 7/2008 | Cheng |
| 2008/0211779 | A1* | 9/2008 | Pryor .......................... 345/173 |
| 2009/0027381 | A1 | 1/2009 | Lee |
| 2009/0027622 | A1 | 1/2009 | Lalley et al. |
| 2009/0040236 | A1 | 2/2009 | Childress et al. |
| 2009/0051671 | A1 | 2/2009 | Konstas |
| 2009/0059096 | A1 | 3/2009 | Yamamoto et al. |
| 2009/0167723 | A1* | 7/2009 | Kwong et al. ................ 345/175 |
| 2009/0189857 | A1 | 7/2009 | Benko |
| 2009/0189917 | A1 | 7/2009 | Benko |
| 2010/0020026 | A1 | 1/2010 | Benko |
| 2010/0023895 | A1 | 1/2010 | Benko |
| 2010/0182236 | A1* | 7/2010 | Pryor .......................... 345/158 |
| 2011/0102319 | A1* | 5/2011 | Lin et al. ..................... 345/158 |

FOREIGN PATENT DOCUMENTS

| | | |
|---|---|---|
| JP | 2003-009039 | 1/2003 |
| JP | 2003-035933 | 2/2003 |
| JP | 2006-094458 | 4/2006 |
| WO | WO2005/114624 | 12/2005 |
| WO | WO2005/119431 | 12/2005 |

OTHER PUBLICATIONS

Christensen Bill, "Sensisphere Multitouch Hemisphere Display", Retrieved at <<http://www.technovelgy.com/ct/Science-Fiction-News.asp?NewsNum=1560>>, Nov. 10, 2008, pp. 1-3.

Sinclair, et al. "Touch-Sensing Input Devices", Retrieved at <<http://research.microsoft.com/users/kenh/papers/touch-sensing.pdf>>, To appear in ACM CHI'99 Conf. on Human Factors in Computing Systems, pp. 8, May 1999.

Patel, et al. "The PadMouse: Facilitating Selection and Spatial Positioning for the Non-Dominant Hand", Retrieved at <<http://www.dgp.toronto.edu/~ravin/papers/chi98_padmouse.pdf>>, Published in Proceedings of 1998 ACM Conference on Human Factors in Computing Systems (CHI'98), pp. 9-16, Apr. 1998.

Han Jefferson Y., "Low-Cost Multi-Touch Sensing through Frustrated Total Internal Reflection", UIST'05, Oct. 23-27, 2005, Seattle, Washington, USA, pp. 115-118.

"Actuality Systems"; http://www.siggraph.org/s2002/exhibition/detail/400.html; 2002.

Balakrishnan; et al., "User Interfaces for Volumetric Displays", Mar. 2001. IEEE. pp. 37-45.

Benko, H. et al.; "Sphere: Multi-Touch Interactions on a Spherical Display"; ACM Conference Proceedings UIST 2008; Oct. 22, 2008; pp. 77-86.

Buckminster, F.; "The Geoscope"; Critical Path 1981; http://www.well.com/user/abs/geoscope.html.

Chan, L.W. et al.; "Gesture-Based Interaction for a Magic Crystal Ball"; 14th International Conference on ACM Virtual Reality Software and Technology; Nov. 5-7, 2007; Newport Beach, California.

Chen et al.; "Flexible Active-Matrix Electronic Ink Display", 2003. Nature 423. p. 136.

Companje, R. et al.; "Globe4D, Time-Traveling with an Interactive Four-Dimensional Globe", MM'06, Oct. 23-27, 2006, Santa Barbara, California, USA. 2 Pages.

Dietz et al.; "DiamondTouch: A Multi-User Touch Technology", 2001, ACM UIST. pp. 219-226.

Fitzmaurice et al.; "Sentient Data Access via a Diverse Society of Devices". 2003. ACM Queue. pp. 53-62.

Fuller, B.; "The Geoscope"; from Education Automation, http://www.vterrain.org/Misc/geoscope.html; 1962.

"Global Imagination"; http://www.globalimagination.com; downloaded Jan. 15, 2008.

Grossman, et al.; "Multi-Finger Gestural Interaction with 3D Volumetric Displays"; UIST '04; vol. 6, Issue 2; Jul. 2005.

Grossman et al.; "The Design and Evaluation of Selection Techniques for 3D Volumetric Displays", 2006. ACM UIST. pp. 3-12.

Hinckley et al.; "New Applications for the Touchscreen in 2D and 3D Medical Imaging Workstations"; Proceedings of SPIE Medical Imaging '95; Feb. 1995.

"iBall+"; http://www.audiovisualizers.com/library/store/iball/iball.htm; downloaded Jan. 16, 2008.

Kettner, S. et al.; "Direct Rotational Interaction with a Spherical Projection"; Proceedings of the Creativity & Cognition Symposium on Interaction: Systems, Practice and Theory; Nov. 16-19, 2004; Sydney, Australia.

Kruger et al.; "How People Use Orientation on Tables: Comprehension, Coordination and Communication", 2003, ACM SIGGROUP Conference on Supporting Group Work. pp. 369-378.

Leary; "Video Projections on a Globe Make Planetary Data Click"; http://www.nytimes.com/2006/06/13/science/13sphe.html?_r=4&adxnnl=1&oref=slogin&adxnnlx=1195256110-XujoB4n89dZC5/zH5rkocQ&oref=slogin&oref=slogin; Jun. 13, 2006.

Liang et al.; "JDCAD: A Highly Interactive 3D Modeling System", 3rd International Conference on CAD and Computer Graphics. Aug. 1993; pp. 217-222.

Marchese et al.; "A Projected Hemispherical Display with a Gestural Interface", 2006, ACM SIGGRAPH Research Posters.

Matsushita et al.; "HoloWall: Designing a Finger, Hand, Body, and Object Sensitive Wall", 1997, ACM UIST. pp. 209-210.

Morris et al.; "Beyond 'Social Protocols': Multi-User Coordination Policies for Co-located Groupware". 2004. ACM CSCW, pp. 262-265.

"The Omniglobe: A Self-Contained Spherical Display System" Emerging Technologies—SIGGRAPH 2003; http://www.siggraph.org/s2003/conference/etech/omniglobe.html; 2003.

"OmniGlobe Technology"; ARC Science Simulations; http://www.arcscience.com/systemDetails/omniTechnology.html; downloaded Jan. 16, 2008.

"PufferSphere" by Pufferfish; hitp://www.pufferfishdisplays.co.uk; downloaded May 13, 2008.

Rekimoto; "SmartSkin: An Infrastructure for Free-hand Manipulation on Interactive Surfaces", 2002. ACM CHI. pp. 113-120.
"Science on a Sphere"; http://sos.noaa.gov; downloaded Jan. 16, 2008.
Scott et al.; "Territoriality in Collaborative Tabletop Workspaces", 2004. ACM CSCW, pp. 294-303.
Shen et al.; "DiamondSpin: An Extensible Toolkit for Around-the-Table Interaction", ACM, CHI. pp. 167-174.
Shibano et al.; "CyberDome: PC Clustered Hemi Spherical Immersive Projection Display", In Proc. of the 2003 International Conference on Artificial Reality and Telexistence (ICAT 2003), Tokyo, Japan, Dec. 3-5, 2003, pp. 1-7.
Shoemake; "Animating Rotation with Quaternion Curves", 1985. ACM SIGGRAPH. pp. 245-253.
Shoemake; "Arcball: A User Interface for Specifying Three-Dimensional Orientation Using a Mouse", 1992. Graphics Interface. pp. 151-156.
Ushida et al.; "i-ball2: An Interaction Platform with a Crystal-ball-like Display for Multiple Users", 2003. International Conference on Artificial Reality and Teleexistence.
"The Videoglobe"; http://www.videoinmotion.com/VideoGlobePage.htm; downloaded Jan. 16, 2008.
Wilson; "TouchLight: An Imaging Touch Screen and Display for Gesture-Based Interaction", 2004. ICMI Conference on Multimodal Interfaces. pp. 69-76.
Wilson; "PlayAnywhere: A Compact Tabletop Computer Vision System", 2005. ACM UIST. pp. 83-92.
Wu, et al.; "Multi-Finger and Whole Hand Gestural Interaction Techniques for Multi-User Tabletop Displays". 2003, ACM UIST. pp. 193-202.
Yang et al.; "PixelFlex: A Reconfigurable Multi-Projector Display System", Proceedings of the conference on Visualization '01, Oct. 21-26, 2001, San Diego, California, 9 Pages.
Yip, et al.; "Visualising Internet Traffic Data with Three-Dimensional Spherical Display", proceedings of the 2005 Asia-Pacific symposium on Information 5isualization—vol. 45, Sydney, Australia, Year of Publication: 2005, pp. 153-158.
PCT Patent Application PCT/US2008/088124; International Search Report and Written Opinion of Jun. 23, 2009; 11 pages.
PCT Patent Application PCT/US2009/051659; International Search Report and Written Opinion dated Mar. 2, 2010; 12 pages.
EP Patent Application 08871181.7; Extended European Search Report of Dec. 20, 2010; 11 pages.
EP Patent Application 09801053.1; Extended European Search Report of Nov. 8, 2011; 14 pages.
CN Patent Application 200880125597.5; First Office Action dated Aug. 26, 2011; 8 pages.
CN Patent Application 200880125597.5; Second Office Action dated Feb. 13, 2012; 6 pages.

\* cited by examiner

CAMERA-BASED MULTI-TOUCH MOUSE

BACKGROUND

Conventional computer systems are typically equipped with a conventional mouse used as an input pointing device. Such a mouse is typically capable of detecting two-dimensional motion relative to the surface upon which it is moved. Such a mouse also typically includes one or more buttons to provide additional input to the computer system. Many computer applications are capable of interpreting a wide variety of inputs including signals generated by pressing one or more buttons on a mouse as well as its movement. But such a conventional mouse tends to be limited by its fixed physical configuration.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for a camera-based multi-touch input device operable to provide conventional mouse movement data as well as three-dimensional multi-touch data. Such a device is based on an internal camera focused on a mirror or set of mirrors enabling the camera to image the inside of a working surface of the device. The working surface allows light to pass through. An internal light source illuminates the inside of the working surface and reflects off of any objects proximate to the outside of the device. This reflected light is received by the mirror and then directed to the camera. Imaging from the camera can be processed to extract touch points corresponding to the position of one or more objects outside the working surface as well as to detect gestures performed by the objects. Thus the device can provide conventional mouse functionality as well as three-dimensional multi-touch functionality.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein:

FIG. 7 is a block diagram showing an example computing environment in which the technologies described above may be implemented and/or interfaced with.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in connection with a computing environment, the environment described is provided as an example and not a limitation. As those skilled in the art will appreciate that the present examples are suitable for application in and/or for a variety of different types of computer environments.

Figure 1:
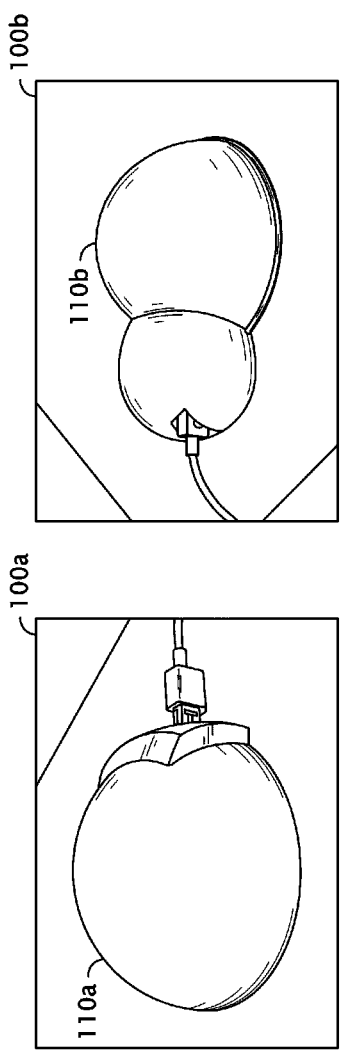
FIG. 1 shows two examples of a camera-based multi-touch input device, each of which is termed herein a "multi-touch mouse" ("MTM").

FIG. 1 shows two examples of a camera-based multi-touch input device 100a and 100b, each of which is termed herein a "multi-touch mouse" ("MTM"). Each of the prototype MTMs shown in FIG. 1, which are provided as examples and not limitations, makes use of the same basic underlying technologies but illustrates physical variations that relate to industrial design, usability, and ergonomics. In general, a MTM includes, among other things, a working surface, such as working surfaces 110a and 110b, a camera, a mirror, and a light source that provides illumination for camera-based multi-touch sensing. In the example devices, the working surface 110 is a diffuse hemisphere with a diameter of approximately 10 cm. In another example, the working surface is typically a shell made of plastic or the like that allows light to pass through, the shell formed in any arbitrary shape or size suitable for use as the working surface of a multi-touch input device. In yet another example, the working surface is deformable and made of a malleable or "squishy" material that may allow light to pass through.

A MTM as described herein may also typically include a conventional mouse mechanism, typically integrated into the base of the MTM, configured to provide conventional mouse movement data as part of the overall MTM functionality. Such a conventional mouse mechanism may be mechanical, optical, or based on any other technology suitable for providing conventional mouse movement functionality and/or data. The term "multi-touch" as used herein typically refers to multiple simultaneous touch points anywhere on the working surface of a MTM. The term "touch point" as used herein typically refers to a point or area on an MTM's working surface detected as being touched by one or more objects. The term "objects" as used herein typically refers to fingers, styli, and/or any other objects placed or moved on (or near) a working surface such that they may be detected by an MTM.

A MTM as described herein provides several advantages over a conventional mouse and a convention touchpad or touch screen. For example, a MTM typically provides for multi-touch functionality including providing "click" data through gesture detection, tapping or clicking detection, or the like. The MTM typically supports detection of a wide range of gestures over its non-planar working surface, with the non-planar characteristics of the working surface enabling gestures that are more natural and intuitive than those possible on a planar working surface, such as that of a touchpad. Gestures on the non-planar working surface may be performed to indicate rotation and/or torque or the like as fingers rotate around the MTM's non-planar working surface. Further, the non-planar surface of the MTM typically allows for gestures in a vertical direction without breaking contact with the working surface. Many other advantages over conventional input devices are also realized by the MTM. The term "gesture" as used herein typically refers to a movement(s) of one or more objects for the purpose of communicating intent to a computer system or the like.

MTM working surface 110 is typically manipulated in a manner similar to that of the body of a conventional mouse. That is, a user typically grips the working surface with several fingers to move the MTM on a flat surface, such as a desktop or the like. Further, the MTM is operable to detect fingers, styli, or the like (objects) and their position (touch) and/or movement (gestures) on working surface 110. In one example, such detection may be used to automatically determine "handedness", or which hand—right or left—is being used to grip the MTM, and to respond accordingly. Such responses may include automatically informing an associated computer system which hand is being used with the MTM.

Figure 2:
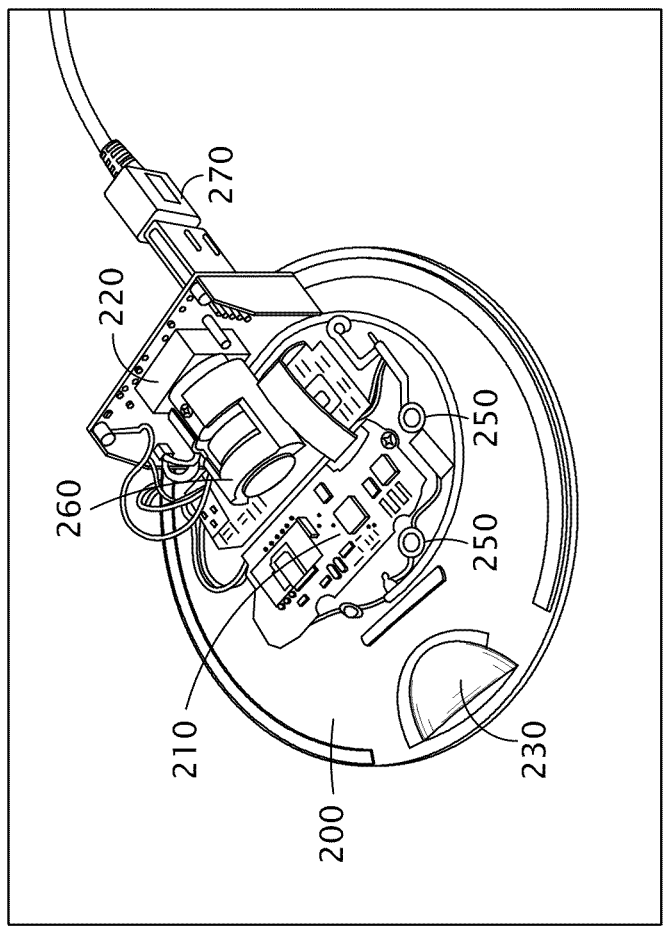
FIG. 2 shows an example MTM base including several key internal elements of an MTM arranged in an example configuration.

FIG. 2 shows an example MTM base 200 including several key internal elements of an MTM arranged in an example configuration. In this example, camera 220 is focused on curved ¼ sphere mirror 230. Internal light source(s) 250 is configured to illuminate the inner portion of the MTM working surface (not shown in FIG. 2). Light filter 260 is disposed over the lens of camera 220 so as to filter light entering the camera lens. In other examples, such a light filter may be optional. In one example, the light source(s), such as light source(s) 250, is one or more infrared ("IR") light-emitting diodes ("LEDs") or the like disposed to uniformly illuminate the inside of a MTM's working surface. Further, the light filter, such as light filter 260, is an IR pass filter that restricts light sensing by a camera to IR light as emitted by the IR light source(s). Restraining the sensing to IR light has the advantage of inhibiting other wavelengths of light from affecting the sensing performance of the MTM. This also allows for other wavelengths of light to be used for other purposes in the MTM. In another example, light filter 260 may additionally or alternatively reduce interference from unwanted ambient light sources or the like. In general, the exact shape of a mirror(s), such as mirror 230 or the like, may not be critical so long as shape characteristics are known or can be determined, such as during a calibration process, so that reflections from the mirror(s) imaged by a camera can be undistorted. The verb "undistort" or the like as used herein typically refers to processing an image(s) such that points and distances in the image(s) are adjusted to reflect physical reality. An undistorted image(s) can be further processed to accurately determine touch points and/or gestures on a working surface.

In another example of an MTM, light source(s) 250 is alternatively an edge light source (not shown in FIG. 2). In this example, a working surface and corresponding edge light source are suitable for supporting conventional Frustrated Total Internal Reflection ("FTIR") techniques or the like. In particular, the working surface of an MTM is edge-lit by the edge light source that may be positioned against a polished edge or the like of the working surface such that the light is essentially trapped within the thickness of the working surface. Light typically remains trapped within the thickness of the working surface except at areas where it is frustrated by some object(s) being in optical contact with the working surface, causing some of the light to scatter out through the working surface. The term "optical contact" as used herein typically refers to an object on (touching) or near a working surface where the term "near" in this context represents a distance that is less than a wavelength of light from the light source(s). When using FTIR techniques, light from an edge light source, such as light source(s) 250 or the like, is typically contained within the thickness of the working surface, such as working surface 110 of FIG. 1 or the like, until it is frustrated by one or more objects in optical contact with the working surface, at which point light is typically scattered and received by a mirror(s), such as mirror 230 or the like, and is further reflected by the mirror(s) to a camera, such as camera 220 or the like.

Further, conventional mouse mechanism 210 is typically attached to base 200 so as to provide conventional mouse movement data for the MTM. Interface 270 is configured to provide multi-touch data and the like, as well as conventional mouse movement data, to a computer system coupled to interface 270. In one example, Interface 270 is a universal serial bus ("USB") interface. Additionally or alternatively, any suitable interface may be used including a wireless interface.

Figure 3:
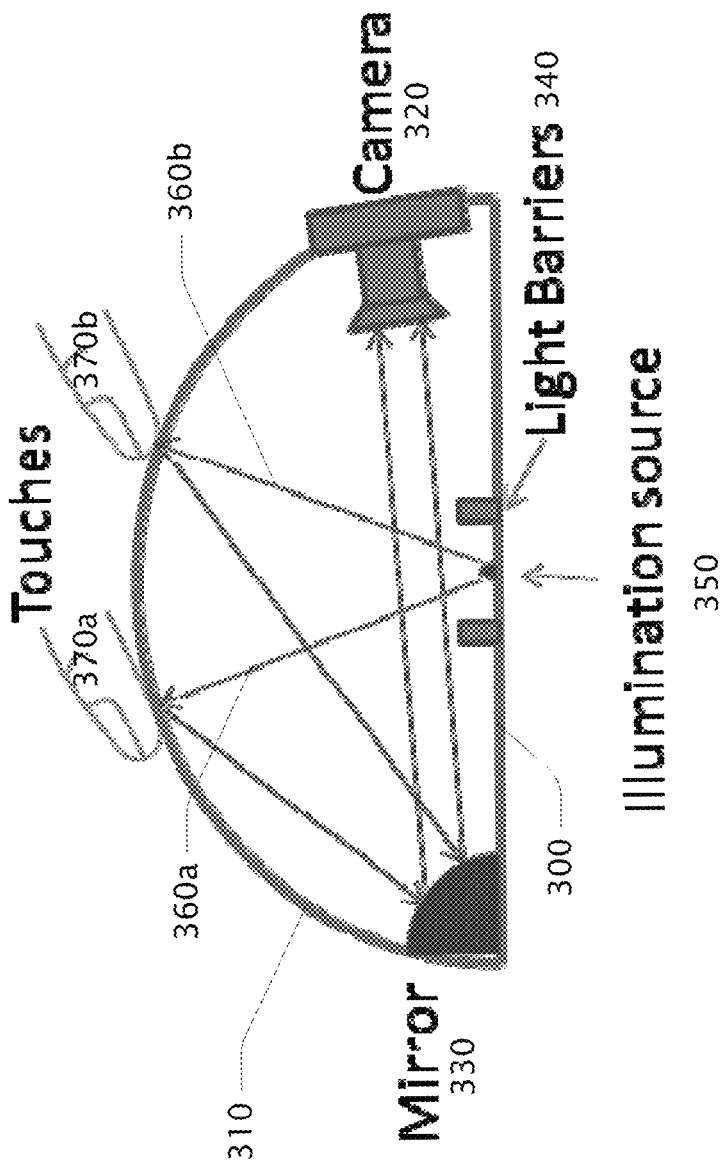
FIG. 3 shows a schematic illustration of an implementation of an example MTM and illustrates an example of multi-touch sensing.

FIG. 3 shows a schematic illustration of an implementation of an example MTM and illustrates an example of multi-touch sensing. In this example, the base 300 includes illumination source or internal light source(s) 350 operable to uniformly illuminate the inside of working surface 310. Light 360 typically reflects off of an object on the outside of working surface 310 onto mirror 330 that further reflects the light into camera 320. By processing the undistorted image(s) from camera 310 in mirror 330, a user's touch points and/or gestures on working surface 310 can be detected. Such detecting is typically referred to herein as "multi-touch sensing". Undistorting may be achieved using conventional techniques. An image(s) may be further processed to extract and track individual touch points and/or gestures on working surface 310. The nouns "image" and "image(s)" as used herein typically refer to an image or a sequence of images or a video stream or the like.

In this example, camera 320 is typically able to image the entire unobscured portion of the inside of working surface 310 by focusing on mirror 330. Light barriers 340 or the like may be disposed to ensure that no direct light from light source(s) 350 enters the lens of camera 320. In one example, a MTM working surface, such as working surface 310, is a diffuse surface. Such a diffuse or translucent surface may simplify detecting objects on the diffuse surface versus objects in the background. Given a diffuse surface, objects touching the surface tend to be clearly visible and in focus, while objects in the background tend to appear blurry and obscure. In a further example, a diffuse working surface may be diffuse in a specific wavelength(s) of light only, such as IR light, and not in others. In yet another example, a working surface may be transparent, semi-transparent, or the like.

An illustration of multi-touch sensing can be seen in FIG. 3. Light from light source(s) 350 illuminates the inside of working surface 310. Most of the light from light source(s) 350 typically passes through working surface 310. Light 360a from light source(s) 350 reflects off of a first touch 370a onto mirror 330 and is further reflected to camera 320. Light 360b from light source(s) 350 reflects off of a second touch 370b onto mirror 330 and is further reflected to camera 320. The resulting image(s) produced by camera 320 can be undistorted and further processed to extract and track individual touch points and/or gestures corresponding to touches 370a and 370*b*. In practice, any number of touch points and/or gestures may be sensed simultaneously by a MTM. The term "touch" as used herein typically refers to an object on or proximate to the outside working surface of an MTM.

In another example of multi-touch sensing based on FTIR techniques, working surface 310 is edge-lit by light source(s) 350 (not shown) such that light is trapped within the thickness of working surface 310. An object(s) in optical contact with working surface 310 causes some of the light from the edge light source(s) to be scattered and received by mirror 330. Camera 320 is able to image the entire unobscured portion of the inside of working surface 310 by focusing on mirror 330. Light barriers 340 or the like may be disposed to ensure that no scattered light other than that reflected off of mirror 330 enters the lens of camera 320. The resulting image(s) produced by camera 320 can be undistorted and further processed to extract and track individual touch points and/or gestures corresponding to the object(s) in optical contact with the working surface.

A MTM as described herein may provide multi-touch sensing and the like as a stand-alone device and/or in combination with a computer system or the like. Undistorting and further processing of a multi-touch image(s) from camera 320 may be performed by camera 320, by the MTM including camera 320, and/or in combination with a computer system, other hardware, firmware, software drivers or the like, and/or other computer applications or the like, or any combination of the foregoing.

By focusing camera 320 on curved mirror 330, the camera is able to image the entire unobscured portion of the inside of working surface 310 resulting in the ability to produce a low-profile MTM. In contrast, a centrally located a fish-eye lens and camera would require working surface 310 to be much taller, this tallness negatively impacting the usability of such a device.

In one example, "mouse clicks" or "clicking" can be performed via object gestures or tapping on a working surface. Alternatively or additionally, clicking can be achieved by disposing a microswitch or the like under working surface 310 such that it is operable to allow a user to press working surface 310 to produce a mouse click and generate the corresponding data.

Figure 4:
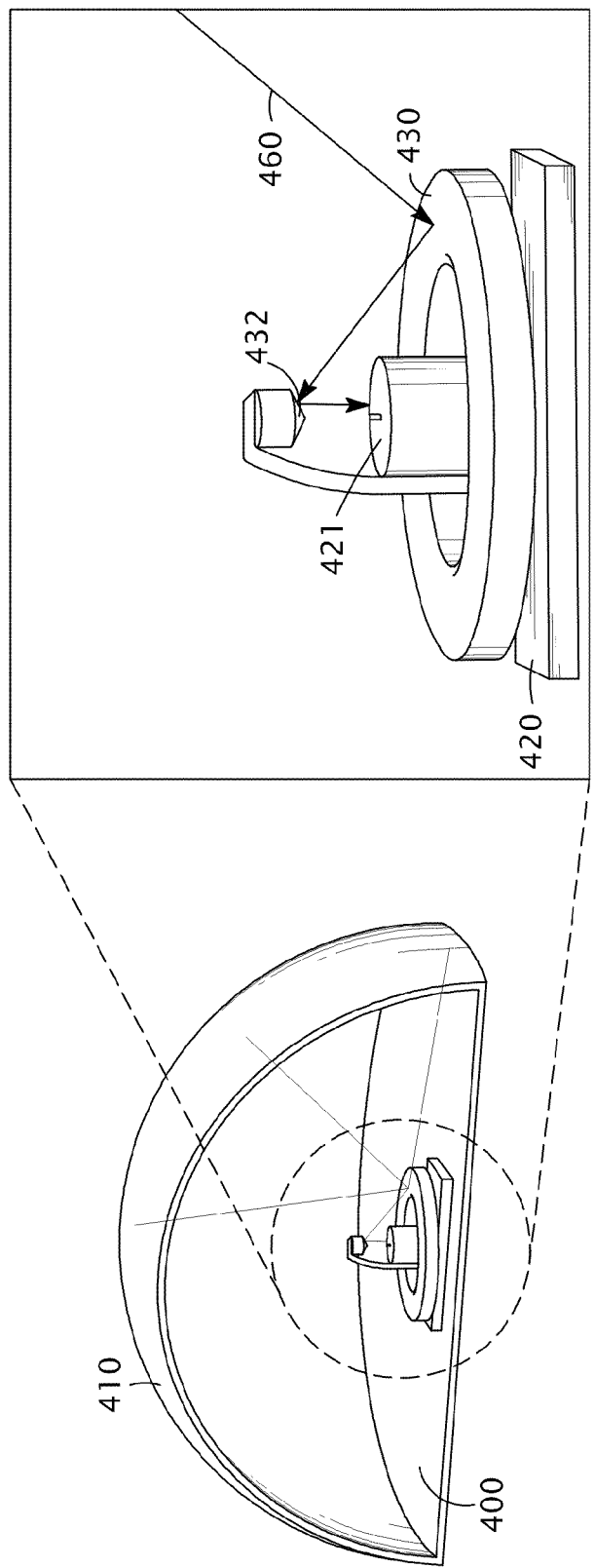
FIG. 4 shows a schematic illustration of an alternative implementation of an example MTM and illustrates another example of multi-touch sensing.

FIG. 4 shows a schematic illustration of an alternative implementation of an example MTM and illustrates another example of multi-touch sensing. This implementation is similar to that of FIG. 3 with key exceptions described herein below. This implementation provides for a completely and uniformly sensed MTM (360 degrees horizontally) where the entire working surface 410 can be imaged by camera 420. In this example, the base 400 includes toroidal mirror 430 and a stand holding conical mirror 432 with both mirrors 430 and 432 together being operable to uniformly view the entire working surface 410 and directed any reflected light from working surface 410 into lens 421 of camera 420. This working surface-mirror-lens-camera configuration provides a completely and uniformly sensed working surface 410, except for the area that is obscured by conical mirror 432 and its stand. In general, the exact shape of a mirror(s), such as mirrors 430 and 432 or the like, may not be critical so long as shape characteristics are known or can be determined, such as during a calibration process, so that reflections from the mirror(s) imaged by a camera can be "undistorted".

Another example of multi-touch sensing can be seen in FIG. 4. Light from light source(s) (not shown) illuminates the inside of working surface 410. Most of the light typically passes through working surface 410. Light 460 reflects off of a touch (not shown) onto toroidal mirror 430 and is further reflected onto conical mirror 432 and is further reflected into camera 420 via lens 421. The resulting image(s) produced by camera 420 can be undistorted and further processed to extract and track individual touch points and/or gestures corresponding to touches. In practice, any number of touch points and/or gestures may be sensed simultaneously by a MTM.

In another example of multi-touch sensing based on FTIR techniques, working surface 410 is edge-lit by edge light source(s) (not shown) as described in connection with FIGS. 2 and 3. An object(s) in optical contact with working surface 410 causes some of the light from the edge light source(s) to be scattered and received by toroidal mirror 430 and then reflected onto conical mirror 432. Camera 420 is able to image the entire unobscured portion of the inside of working surface 410 by focusing on conical mirror 432. Light barriers, such as light barriers 340 of FIG. 3 or the like, may be disposed to ensure that no scattered light other than that reflected off of mirror 432 enters lens 421 of camera 420. The resulting image(s) produced by camera 420 can be undistorted and further processed to extract and track individual touch points and/or gestures corresponding to the object(s) in optical contact with the working surface.

In yet another example of multi-touch sensing applicable at least to the examples described in connection with FIGS. 3 and 4, ambient light from outside of a MTM way be used as a light source(s) and/or may overpower an internal MTM light source(s). In this example, the ambient light passes through the working surface and reflects off the mirror(s) to the camera. But objects on the working surface create a shadow by blocking the ambient light. Thus multi-touch sensing in this example takes place by tracking the shadows as opposed to the light. All other aspects of the MTM remain similar to those already described. The term "ambient light" as used herein typically refers to any light originating from outside of a MTM sufficient to support operation of the MTM and/or to overpower a light source(s) integral to the MTM.

In general, light for MTM operations may be provided from inside a MTM (e.g., light source(s) 350 as shown in FIG. 3 or the like), from outside the MTM (e.g., ambient light or the like), and/or from edge-lighting of the working surface of the MTM (e.g., light source(s) suitable for FTIR techniques or the like). In general, the term "light source(s)" as used herein may refer to any or all of the foregoing unless specifically indicated otherwise.

Figure 5:
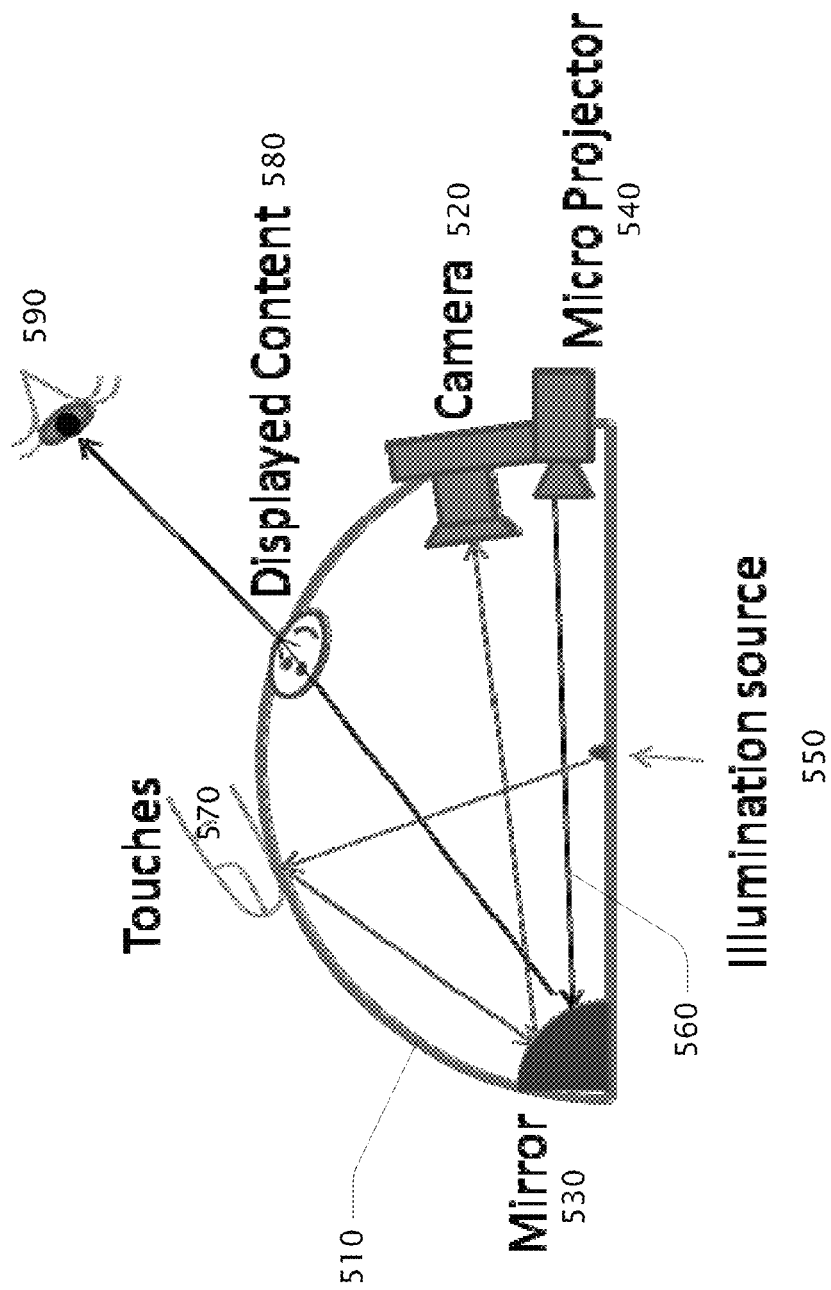
FIG. 5 shows a schematic illustration of an alternative implementation of an example MTM operable to display a user interface on its working surface.

FIG. 5 shows a schematic illustration of an alternative implementation of an example MTM operable to display a user interface on its working surface 510. This implementation is generally similar to those of FIGS. 3 and 4 or the like with the addition of projector 540 and related control functionality and the like. In one example, projector 540 is a laser projector. In alternative examples, projector 540 may be any type of projector suitable to display a user interface on working surface 510, such as a micro projector or the like. By incorporating projector 540 into the MTM it becomes both an input device and an output device capable of displaying a user interface. In general, projector 540 projects a user interface to mirror(s) 530 or the like that reflects the user interface to working surface 510. In this example, working surface 510 is suitable for allowing the projected user interface (displayed content 580) to be viewed on the outside of working surface 510 by user 590 or the like. Such displayed content 590 may be projected 560 using light in a user-visible wavelength(s) while light source(s) 550 used for multi-touch sensing may provide light in a non-user-visible wavelength(s) such as infrared light or the like. Such a projected user interface may display, among other things, context-sensitive information, various controls operable via multi-touch sensing, menus, avatars or the like, or visual feedback to multi-touch input. The term "user" as used herein typically refers to a human or entity capable of sight or the like.

In another example an MTM includes a "squishy" working surface 510. This example is generally similar to those of FIGS. 3 and 4 or the like but with a malleable or deformable ("squishy") working surface 510 instead of a solid one. In this example, projector 540 projects a known pattern onto the inside of working surface 510. Camera 520 images the known pattern on the inside of working surface 510 via mirror 530 or the like. Distortions in the known pattern as imaged by camera 520 are measured and correlated with non-planar positions of points on the inside of working surface 510 thus revealing areas and amounts of working surface 510 distortion. In this example, working surface 510 is operable to reflect the wavelengths of light used for projecting the known pattern while allowing other wavelengths to pass through. By interleaving or time-sequencing projections, or using other techniques, projector 540 may project a user interface(s) as well as a known pattern(s) used for shape detection.

Figure 6:
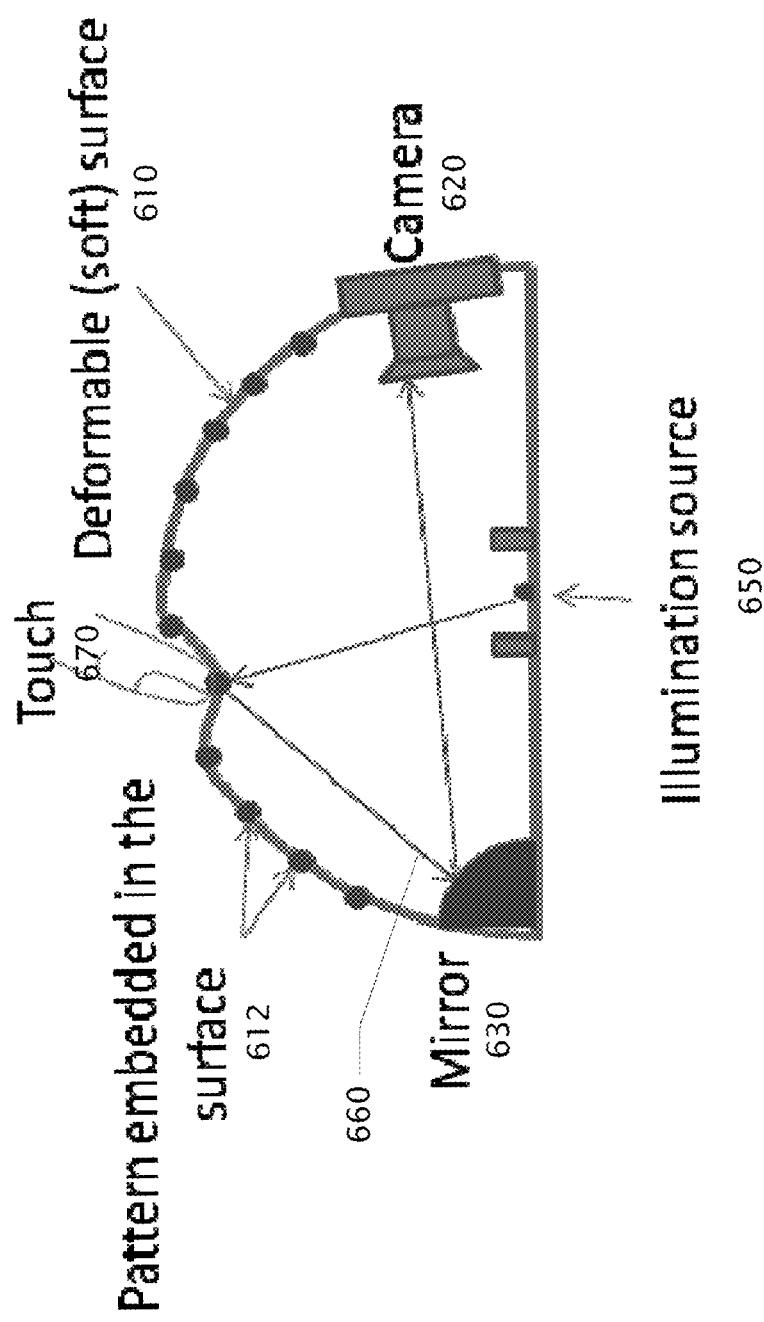
FIG. 6 shows a schematic illustration of an alternative implementation of an example MTM with a "squishy" working surface.

FIG. 6 shows a schematic illustration of an alternative implementation of an example MTM with a "squishy" working surface 610. This implementation is generally similar to those of FIGS. 3, and 4 or the like but with a malleable or deformable ("squishy") working surface 610 that includes an embedded pattern 612. In one example, pattern 612 is a known pattern that is embedded into at least the inside of working surface 610 and that is formed of retro-reflective and/or florescent material and/or conventional ink or paint or the like sufficient to reflect light from light source(s) 650 to mirror(s) 630 or the like and then to camera 620. Distortions in the known pattern as imaged by camera 620 via mirror(s) 630 may be measured and correlated with positions of points on the inside of working surface 610 thus revealing areas and amounts of working surface 610 distortion.

Such a "squishy" working surface may allow a user to squeeze or press or the like a MTM and have characteristics of the squeeze detected. Such characteristics may include location(s) and relative amounts and the like. Further, pressing into the working surface may be detected as a "linear button push" for example, providing more than just binary press/unpress information, but also an "amount" of press.

Figure 7:
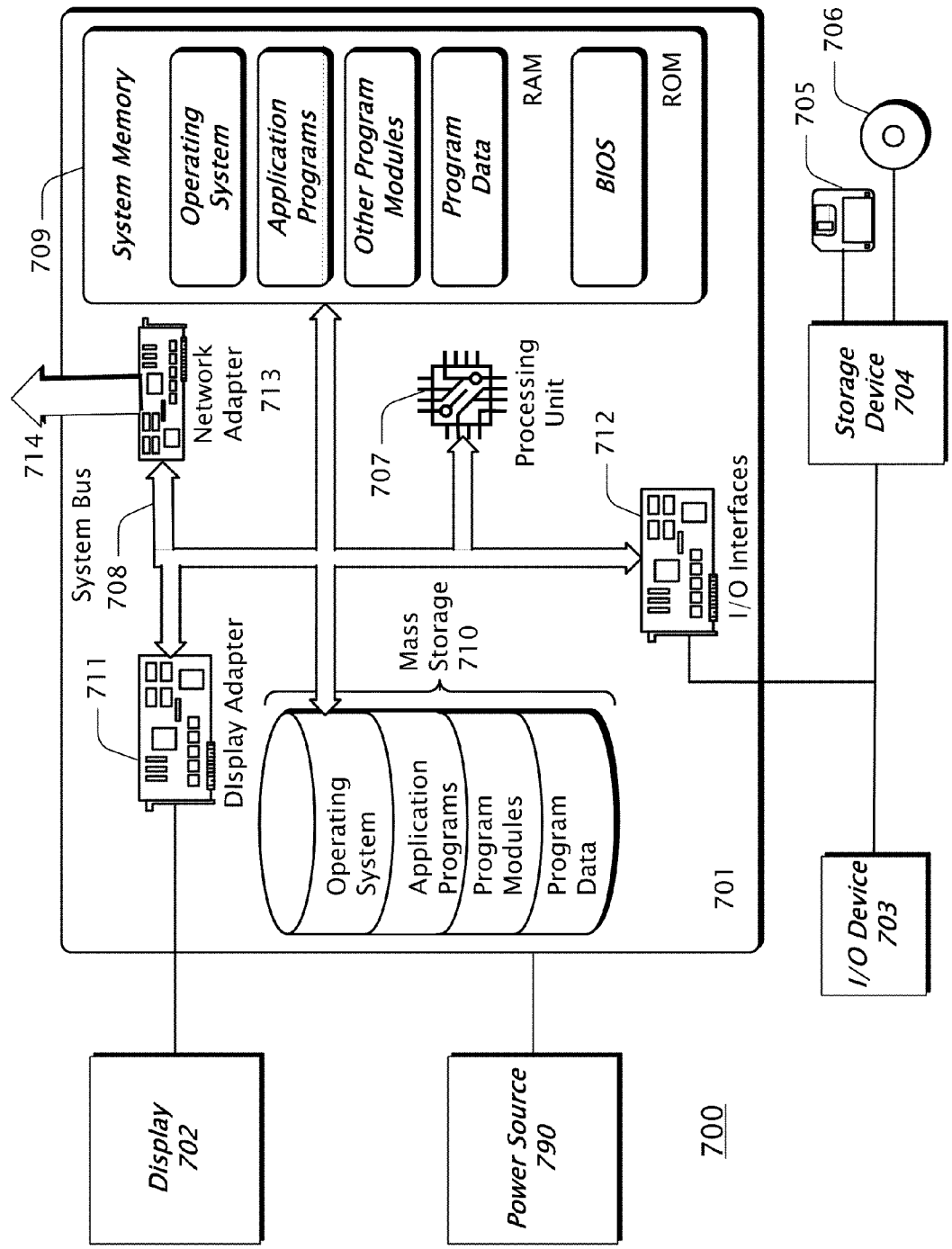

FIG. 7 is a block diagram showing an example computing environment 700 in which the technologies described above may be implemented and/or interfaced with. A suitable computing environment may be implemented with numerous general purpose or special purpose systems. Examples of well known systems may include, but are not limited to embedded computers, cell phones, personal digital assistants ("PDA"), personal computers ("PC"), hand-held or laptop devices, microprocessor-based systems, multiprocessor systems, servers, workstations, consumer electronic devices, set-top boxes, and the like. Such a computing environment may not include all of the elements described herein below. Further, such a computing environment may alternatively and/or additionally include other element not described herein.

Computing environment 700 typically includes a general-purpose computing system in the form of a computing device 701 coupled to various components, such as peripheral devices 702, 703, 704 and the like. System 700 may couple to various other components, such as input devices 703, including voice recognition, touch pads, buttons, keyboards and/or pointing devices, such as a mouse or trackball, via one or more input/output ("I/O") interfaces 712. The components of computing device 701 may include one or more processors (including central processing units ("CPU"), graphics processing units ("GPU"), microprocessors ("μP"), and the like) 707, system memory 709, and a system bus 708 that typically couples the various components. Processor 707 typically processes or executes various computer-executable instructions to control the operation of computing device 701 and to communicate with other electronic and/or computing devices, systems or environment (not shown) via various communications connections such as a network connection 714 or the like. System bus 708 represents any number of several types of bus structures, including a memory bus or memory controller, a peripheral bus, a serial bus, an accelerated graphics port, a processor or local bus using any of a variety of bus architectures, and the like.

System memory 709 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 709 typically stores data, computer-executable instructions and/or program modules comprising computer-executable instructions that are immediately accessible to and/or presently operated on by one or more of the processors 707.

Mass storage devices 704 and 710 may be coupled to computing device 701 or incorporated into computing device 701 via coupling to the system bus. Such mass storage devices 704 and 710 may include non-volatile RAM, a magnetic disk drive which reads from and/or writes to a removable, non-volatile magnetic disk (e.g., a "floppy disk") 705, and/or an optical disk drive that reads from and/or writes to a non-volatile optical disk such as a CD ROM, DVD ROM 706. Alternatively, a mass storage device, such as hard disk 710, may include non-removable storage medium. Other mass storage devices may include memory cards, memory sticks, tape storage devices, and the like.

Any number of computer programs, files, data structures, and the like may be stored in mass storage 710, other storage devices 704, 705, 706 and system memory 709 (typically limited by available space) including, by way of example and not limitation, operating systems, application programs, data files, directory structures, computer-executable instructions, and the like.

Output components or devices, such as display device 702, may be coupled to computing device 701, typically via an interface such as a display adapter 711. Output device 702 may be a liquid crystal display ("LCD"). Other example output devices may include printers, audio outputs, voice outputs, cathode ray tube ("CRT") displays, tactile devices or other sensory output mechanisms, or the like. Output devices may enable computing device 701 to interact with human operators or other machines, systems, computing environments, or the like. A user may interface with computing environment 700 via any number of different I/O devices 703 such as a touch pad, buttons, keyboard, mouse, joystick, game pad, data port, and the like. These and other I/O devices may be coupled to processor 707 via I/O interfaces 712 which may be coupled to system bus 708, and/or may be coupled by other interfaces and bus structures, such as a parallel port, game port, universal serial bus ("USB"), fire wire, infrared ("IR") port, and the like.

Computing device 701 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 701 may be coupled to a network via network adapter 713 or the like, or, alternatively, via a modem, digital subscriber line ("DSL") link, integrated services digital network ("ISDN") link, Internet link, wireless link, or the like.

Communications connection 714, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 790, such as a battery or a power supply, typically provides power for portions or all of computing environment 700. In the case of the computing environment 700 being a mobile device or portable device or the like, power source 790 may be a battery. Alternatively, in the case computing environment 700 is a desktop computer or server or the like, power source 790 may be a power supply designed to connect to an alternating current ("AC") source, such as via a wall outlet.

Some mobile devices may not include many of the components described in connection with FIG. 7. For example, an electronic badge may be comprised of a coil of wire along with a simple processing unit 707 or the like, the coil configured to act as power source 790 when in proximity to a card reader device or the like. Such a coil may also be configure to act as an antenna coupled to the processing unit 707 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 702, I/O device 703, or many of the other components described in connection with FIG. 7. Other mobile devices that may not include many of the components described in connection with FIG. 7, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A multi-touch input device comprising:
   a base;
   a working surface with an inside and an outside, the working surface disposed over the base forming a cavity between the base and the inside of the working surface;
   a light source integral to the multi-touch input device;
   a curved mirror disposed in the cavity;
   a camera focused on the curved mirror;
   a mechanism operable to provide movement data corresponding to movement of the multi-touch input device; and
   an interface configured to send the movement data and multi-touch data to a computer system via the interface, wherein:
      the curved mirror is operable to receive light reflected or scattered by multiple objects outside of the working surface onto the curved mirror and to further reflect the light into the camera,
      the camera is operable to receive the light reflected from the curved mirror, and
      the multi-touch input device is operable to process the light reflected or scattered by the multiple objects and reflected by the curved mirror to the camera to provide the multi-touch data that is sent to the computer system via the interface.

2. The multi-touch input device of claim 1 wherein the camera is operable to image all of the inside of the working surface that is unobscured to the curved mirror.

3. The multi-touch input device of claim 1 wherein the light source provides infrared light.

4. The multi-touch input device of claim 3 further comprising an infrared pass filter disposed between the camera and incoming light to the camera.

5. The multi-touch input device of claim 1 further comprising a light barrier operable to restrict the camera to imaging light reflected from the curved mirror.

6. The multi-touch input device of claim 1 wherein the working surface is a diffuse surface.

7. The multi-touch input device of claim 1, wherein the multi-touch input device is operable to sense a plurality of gestures simultaneously.

8. The multi-touch input device of claim 1, wherein the curved mirror is at least partly spherical.

9. The multi-touch input device of claim 8, wherein the curved mirror is a curved ¼ sphere.

10. The multi-touch input device according to claim 1, further comprising a projector configured to project a known pattern onto the inside of the working surface, wherein the multi-touch input device is operable to measure distortions in the known pattern to reveal areas of distortion on the working surface.

11. The multi-touch input device according to claim 1, further comprising a projector configured to project a user interface viewable from the outside of the working surface.

12. The multi-touch input device of claim 11, wherein the projector is configured to project the user interface in a visible spectrum while the light source is configured to project a non-visible wavelength of light for multi-touch sensing via the camera.

13. The multi-touch input device of claim 1, wherein the working surface includes an embedded pattern formed of material that is configured to reflect the light.

14. A device comprising:
a base;
a working surface with an inside and an outside, the working surface disposed over the base forming a cavity between the base and the inside of the working surface, wherein the working surface is a diffuse surface;
a curved mirror disposed within the cavity and above the base;
a camera focused on the curved mirror;
a light source of infrared light integral to the device, wherein the infrared light from the light source:
reflects off of multiple objects positioned outside the working surface,
is received by the curved mirror, and
is then reflected from the curved mirror to the camera;
an infrared pass filter operable to filter non-infrared light reflected by the curved mirror to the camera;
a mechanism operable to provide movement data corresponding to movement of the device; and
an interface configured to send the movement data and multi-touch data to a computer system via the interface, wherein:
the camera is operable to receive the infrared light reflected by the curved mirror, and
the device is operable to process the infrared light reflected by the multiple objects and the curved mirror to the camera to provide the multi-touch data that is sent to the computer system via the interface.

15. The device of claim 14 wherein the device is operable to process an image of the inside of the working surface to extract a touch point corresponding to a position of an individual object positioned outside the working surface.

16. The device of claim 14 wherein the device is operable to process an image of the inside of the working surface to detect a gesture performed by one or more of the multiple objects positioned outside the working surface.

17. A multi-touch input device comprising:
a base;
a working surface with an inside and an outside, the working surface disposed over the base forming a cavity between the base and the inside of the working surface, wherein the working surface is a diffuse surface;
a toroidal mirror;
a conical mirror;
a camera disposed in the cavity and focused on the conical mirror;
a light source of light integral to the device, wherein light from the light source is scattered by an object in optical contact with the working surface;
a mouse mechanism operable to provide conventional mouse movement data corresponding to movement of the multi-touch input device; and
an interface configured to provide the conventional mouse movement data and multi-touch data to a computer system via the interface, the multi-touch data corresponding to the object;
wherein:
the toroidal mirror is operable to receive the light and reflect the light to the conical mirror;
the conical mirror is operable to reflect the light to the camera, and
the multi-touch input device is operable to process the light reflected by the object, the toroidal mirror, and the conical mirror to the camera to provide the multi-touch data that is sent to the computer system via the interface.

18. The multi-touch input device of claim 17, wherein the device is operable to process an image of the inside of the working surface to extract a touch point corresponding to a position of the object.

19. The multi-touch input device of claim 17, wherein the multi-touch input device is operable to process an image of the inside of the working surface to detect a gesture performed by the object.

20. The multi-touch input device of claim 17, wherein the multi-touch input device is operable to perform multi-touch functionality responsive to a plurality of objects disposed at multiple points on the outside of the working surface simultaneously.

* * * * *